May 9, 1950     A. E. WIEDENHOEFT     2,507,074
LIGHTING FIXTURE FOR CIRCULAR FLUORESCENT
AND INCANDESCENT LAMPS

Filed April 23, 1945     2 Sheets-Sheet 1

Inventor:
Arthur E. Wiedenhoeft
By Kent W. Wonnell
Attorney

May 9, 1950

A. E. WIEDENHOEFT 2,507,074

LIGHTING FIXTURE FOR CIRCULAR FLUORESCENT
AND INCANDESCENT LAMPS

Filed April 23, 1945

Inventor:
Arthur E. Wiedenhoeft
By Kent U. Worrell
Attorney

Patented May 9, 1950

2,507,074

UNITED STATES PATENT OFFICE 2,507,074

LIGHTING FIXTURE FOR CIRCULAR FLUORESCENT AND INCANDESCENT LAMPS

Arthur E. Wiedenhoeft, Glen Ellyn, Ill.

Application April 23, 1945, Serial No. 589,736

5 Claims. (Cl. 240—51.12)

This invention relates in general to a lighting fixture of the combined direct and indirect type and is more particularly described as a floor lamp combining incandescent and fluorescent lamps.

An important object of the invention is to provide a lighting fixture having means for supporting a circular tube type of lamp.

Still a further object of the invention is to provide supporting means for a circular lighting tube which fold up compactly for shipment and storage when the tube lamp is not supported thereby.

A further object of the invention is to provide a combined circular fluorescent type of lamp having supporting means therefor adjacent a central incandescent lamp with a light modifying shade or globe between them.

Still a further object of the invention is to provide an electric fixture having a circular fluorescent tube supported at one side of a globe or reflector and an incandescent lamp supported at the other side of the globe or reflector, one being mainly for direct illumination and the other intended to provide indirect illumination, each modifying the other through the globe or reflector.

A further object of the invention is to provide a fluorescent lamp fixture adapter which may be applied to present designs of lighting fixtures with a simple modification consisting of supporting arms for holding a tube lamp in substantially horizontal position and for making connections with the terminals at the ends of a tubular lamp.

Still a further object of the invention is to provide a lighting fixture for a circular fluorescent type of lamp having hinged supporting arms, one of which includes terminals for the lamp which are concealed in an opening in the arm.

Other objects of the invention will appear in the specification and will be apparent from the accompanying drawings in which Fig. 1 is a sectional view, with some of the parts in elevation, of a floor lamp type of fixture in accordance with this invention;

Fig. 3 is an enlarged plan view of the fixture top supporting plate;

Fig. 4 is a sectional detail taken on the line 4—4 of Fig. 3;

Fig. 5 is a side elevation of the fluorescent tube arm which has electrical conductors concealed therein;

Fig. 6 is a top view of the arm shoulder of Fig. 5;

Fig. 7 is a sectional view of the arm taken on the line 7—7 of Fig. 5; and

Fig. 8 is a view of the circular tube lamp supporting arms swung upwardly and enclosed in a tubular container for compactly storing and shipping the fixture support.

Figure 1:
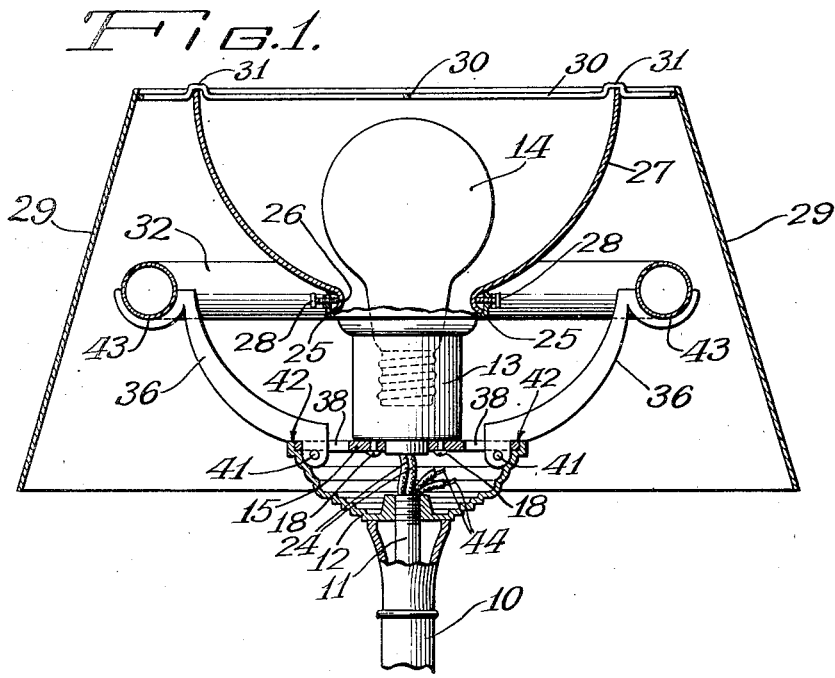
Figure 2:
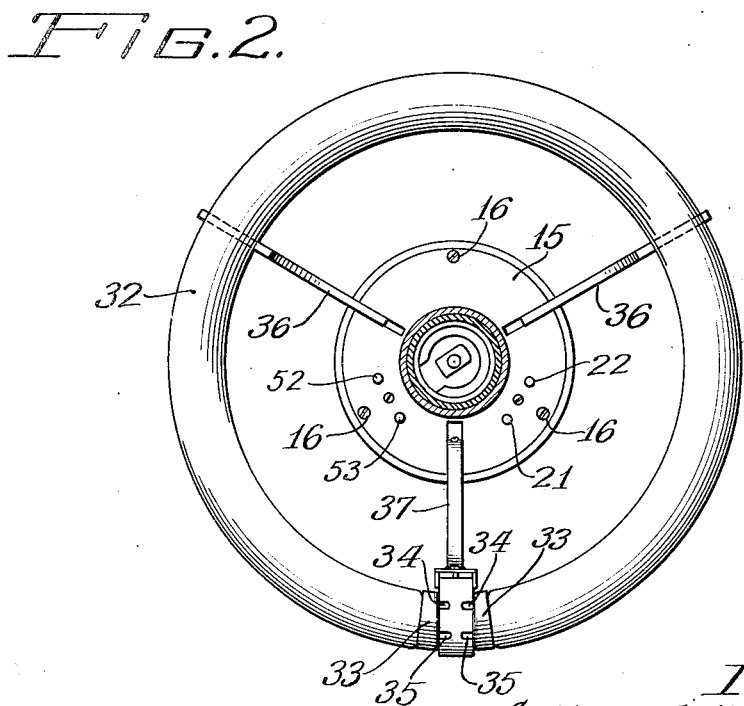
Fig. 2 is a plan view of the fluorescent tube and its supporting means.

The addition of a circular luminescent tubular lamp to the lighting fixture art makes it possible to combine tube lamps and incandescent lamps in a pleasing, compact arrangement for lighting fixtures usually surrounding the incandescent lamp with the tubular lamp and having a somewhat translucent globe or reflector interposed between the two lamps so that either one may be specially illuminated, or both may be lighted at the same time and each will modify the other to the extent permitted by the interposed globe.

In a house lighting fixture such as a floor lamp it is also customary to enclose both lamps in an outer decorative and partially transparent shade which will be illuminated or partially illuminated when either of the lamps is lighted. Usually one of the lamps, as the incandescent lamp is directed upwardly within a partial globe or reflector to provide indirect illumination and the tubular lamp which gives a softer light is disposed below the upwardly turned semi-circular globe or reflector and within the shade for direct illumination.

Referring now more particularly to the drawings, a tubular supporting stem 10 has a conduit pipe 11 extending therethrough and threaded centrally into a decorative flaring fitting 12 secured thereby to the top of the stem in an incandescent lamp. The upper end of the conduit may be inserted directly into the lower end of a socket 13 in which a filament lamp 14 is inserted for illumination at the outer end of the socket. The fitting 12 may therefore be regarded as an adaptor which is inserted between the end of the conduit pipe and the incandescent socket for adding a circular luminescent tube lamp to the fixture.

In the top of the fitting 12 is a metal supporting plate 15 secured thereto by suitable fastening means such as screws 16. At the center of the plate is a perforation 17 for receiving an incandescent lamp socket and with adjacent threaded perforations through which screws 18 are inserted from the underside into the socket 13 for holding it tightly in place. At one edge of the plate is a switch 19 mounted at the underside thereof and secured in place by a fastening screw 20 extending through the plate with opposite push buttons 21 and 22 extending through openings 23 in the plate and connected oppositely together so that when one push button is depressed the other one is raised from its opening.

Thus the switch controls the illumination of the lamp 14 in a wellknown manner through conductor wires 24 extending from the conduit pipe 11 to the switch and to the lamp through the socket 13 thereof.

At the outside of the socket is a metal holder having an upper flange or rim 25 in which the lower rounded neck 26 of an outwardly flaring substantially semi-circular globe or reflector is seated and is retained by seat screws 28 extending through the flange and engaging the rounded neck of the globe. This globe is preferably of thin transparent or semi-transparent material so that even though the lamp is disposed therein and the globe tends to reflect the illumination from the lamp in one direction, the globe will also appear bright and illuminated from the other side. An outer decorative shade or reflector 29 is commonly supported by one or more cross-wires 30 at the top thereof, the wires usually having notches 31 adjacent their outer ends for seating and holding the reflector on top of the globe 27.

With the above construction a complete incandescent lighting fixture is presented to which may be added a fluorescent lamp 32 of the circular type which has end fittings 33 spaced close together with terminals 34 and 35 projecting therefrom to which electrical connections are made for illuminating the tube. These tubular lamps are intended to be operated in substantially horizontal position and a plurality of arms 36 and 37 are pivotly mounted in the plate 15 to support the lamp 32 and to make suitable circuit connections with the terminals thereof.

Arms 36 are pivotly mounted in slots 38 and arm 37 is somewhat wider and is pivotly mounted in a slot 39 of the plate. The pivotal mounting of each arm consists of a projection 40 extending downwardly from it with a screw 41 inserted through the lower end of the arm and through the projection.

Each arm has an outwardly projecting lower portion forming an abutment 42 adjacent the pivoted end which abuts the upper surface of the plate 15 outside of the slot 38, or 39, and each arm rounds outwardly and upwardly therefrom to provide a pleasing contour and outline corresponding somewhat to the curvature of the globe or reflector 27. At the upper end of each arm 36 is an outwardly extending curved seat 43 properly spaced from the center for receiving the circular tube lamp 32 therein and holding it in horizontal position. The other arm 37 is preferably hollow or recessed in cross section as shown more clearly in Figure 7 and containing two or more insulated electric wires 44 therein, the channel or opening in the arm being suitably closed by a cover plate 45 extending along the arm and secured in place by fastening screws 46. At the upper end of this arm 37 is a terminal block 47 of insulating material having slots 48 and 49 in opposite faces thereof preferably differing in length and having spring terminal contact clips 50 therein connected with the contact wires 44 for receiving the lamp terminals 34 and 35 holding them in place and making electrical connections therewith.

In order to connect a circular tubular lamp in the block 47 it is necessary only to press the contacts 34 and 35 downwardly in the opposite slots 48 and 49 until they engage in the spring contact clips thereby holding the tubular lamp in proper horizontal position supported by the arms 36 and 37.

The conductors 44 for the fluorescent lamp may extend below the plate 15 to another switch 51 mounted on the underside of the plate and having push buttons 52 and 53 extending through to the upper side of the plate, in a well-known manner.

With this construction the fluorescent lamp may be quickly and easily connected and disconnected and also easily disengaged from the supporting arms. By disengaging the lamp from the terminal block 47 it may be raised from the arms 36 and 37 and the arms swung inwardly, thus allowing the circular tube lamp to be raised and removed from the top of the fixture or moved downwardly, the inwardly rotated arms to the bottom of the fixture and to the base of the support 10. For compactly storing and shipping the fixture the shade and globe may be disconnected and removed, the arms 36 and 37 may be rotated in their slots upwardly until they engage the marginal rim 25 as shown more clearly in Figure 8 whereupon a tubular binder or holder 54 of protecting material such as paper fibre or the like may be applied over and around the arms holding them inwardly and protecting them for storage or shipment. This construction is therefore adapted to be supplied either as a unitary structure for combining incandescent and tubular fluorescent lamps in a single fixture, or the parts for supporting the tubular lamp may be supplied as an adapter for lamps and fixtures embodying incandescent lamps as now made and used. When the two lamps are combined in a single fixture each modifies the illumination of the other particularly when the globe between them is more or less transparent thus combining soft and pleasing direct illumination supplemented by refracted and reflected indirect illumination.

Although a single type of fixture such as a floor or pedestal lamp has been described, it is apparent that a fluorescent fixture may be fitted to other electric fixtures and combined with incandescent lamps in a wide variety of forms and for widely different uses, without departing from the spirit and scope of the invention.

I claim:

1. In an electric lighting fixture, a socket and incandescent lamp mounted in the socket and extending upwardly, a shade secured to the socket as flaring outwardly therefrom, a supporting fitting at the bottom of the socket projecting outwardly beyond the socket, a plurality of arms pivoted within the extending portion of the fitting and rotatable relatively inwardly and outwardly with respect to the socket and having supporting hooks at their outer ends, and a circular fluorescent tube lamp supported by the hook extremities of the arms and movable upwardly outside of the arms when they are swung inwardly, the arms swinging outwardly when the lamp is moved downwardly from a position above them to engage within the hooks.

2. An electric lighting fixture, comprising a supporting fitting extending upwardly and flaring outwardly, a socket secured to the central portion of the fitting within the outwardly flaring portion, an incandescent lamp mounted at the upper end of the socket, a reflector secured to the socket and extending upwardly from the lamp, a shade supported by the reflector and extending downwardly and outwardly around the reflector, a plurality of arms pivoted in the extending portion of the fitting to swing relatively inward and outward with respect to the lamp, and adapted to engage the fitting to limit their outward and downward swinging movement, the outer end of each arm having a supporting hook at the extremity, and a circular fluorescent tube lamp movable upwardly at the outside of the arms which swing within the lamp in moving the lamp past the arms, the lamp being supported by the hooks at the ends of the arms when the lamp is moved downwardly after the arms have been swung outwardly to engage the lamp with the hooks.

3. A structure, in accordance with claim 1, in which the tubular lamp has spaced terminals close together for making electrical connections with the ends of the tube and one of the arms having contact means for engaging the contact means at the opposite ends of the tube.

4. An electric lighting fixture, comprising a supporting member having an incandescent lamp socket at its upper end, an incandescent lamp mounted in the socket and fitting at the bottom of the socket extending outwardly beyond the periphery of the socket, arms pivoted in fitting and movable relatively inward and outward with respect to the socket, the outward movement being limited by engagement of the arms with the outer edge of the fitting, each arm having a rounded supporting hook at its upper end, a circular tubular lamp adapted to be moved upwardly past the arms and their hooks when the arms are swung inwardly, the lamp engaging the hooks when the arms are swung outwardly after the lamp is moved upwardly beyond the hooks, and a transparent reflector supported by the socket and interposed between the incandescent lamp and the tubular lamp, the lamp operating separately in conjunction to illuminate the reflector.

5. In an electric lighting fixture, a socket for receiving an incandescent lamp, means for removably attaching a flaring reflector at one end of the socket, a fitting extending beyond the socket at the other end thereof, a plurality of arms pivoted in the extending portion of the fitting and movable relatively inward and outward with respect to the socket, the outer ends of the arms having hook portions for supporting a tubular lamp when the arms are in their extended position and the arms being rotatable inwardly against the upper end of the socket when the reflector is removed therefrom, the hooked extremities extending inwardly and upwardly so that their outer edges are within a circle substantially as large in diameter as the outer extending edge of the fitting so that the fitting socket and arms may be compactly enclosed within a cylindrical holder.

ARTHUR E. WIEDENHOEFT.

REFERENCES CITED

The following references are of record in the file of this patent:

UNITED STATES PATENTS

| Number | Name | Date |
| --- | --- | --- |
| D. 124,076 | Levy | Dec. 17, 1940 |
| D. 129,837 | Mache et al. | Oct. 7, 1941 |
| 2,219,541 | Kanter | Oct. 29, 1940 |
| 2,264,253 | Steiber | Nov. 25, 1941 |
| 2,265,644 | Hodges | Dec. 9, 1941 |
| 2,288,941 | Curtis | July 7, 1942 |
| 2,298,961 | Miller | Oct. 13, 1942 |
| 2,339,166 | Harrison | Jan. 11, 1944 |
| 2,366,252 | Geiger | Jan. 2, 1945 |
| 2,392,785 | Thomas | Jan. 8, 1946 |
| 2,350,462 | Johns | June 6, 1944 |
| 2,406,896 | Owen | Sept. 3, 1946 |
| 2,419,965 | Pieper | May 6, 1947 |
| 2,435,715 | Headings | Feb. 10, 1948 |

FOREIGN PATENTS

| Number | Country | Date |
| --- | --- | --- |
| 355,175 | Great Britain | Aug. 20, 1931 |